(12) United States Patent
Dhir et al.

(10) Patent No.: US 6,980,939 B2
(45) Date of Patent: Dec. 27, 2005

(54) METHOD AND SYSTEM FOR OPTIMIZING THE DESIGN OF A MECHANICAL SYSTEM

(75) Inventors: Anil Kumar Dhir, Ann Arbor, MI (US); Scott Patrick Crane, Louisville, KY (US)

(73) Assignee: Ford Motor Company, Dearborn, MI (US)

( * ) Notice: Subject to any disclaimer, the term of this patent is extended or adjusted under 35 U.S.C. 154(b) by 777 days.

(21) Appl. No.: 10/064,173

(22) Filed: Jun. 18, 2002

(65) Prior Publication Data

US 2003/0009317 A1 Jan. 9, 2003

Related U.S. Application Data

(60) Provisional application No. 60/299,280, filed on Jun. 18, 2001.

(51) Int. Cl.[7] .............................................. G06G 7/48
(52) U.S. Cl. ................... 703/7; 703/2; 703/22; 700/30; 700/31
(58) Field of Search ........................... 703/2, 7, 17, 22; 716/4, 19; 700/28–31

(56) References Cited

U.S. PATENT DOCUMENTS

| | | | | |
|---|---|---|---|---|
| 5,646,870 A | * | 7/1997 | Krivokapic et al. | 716/4 |
| 5,655,110 A | * | 8/1997 | Krivokapic et al. | 716/19 |
| 6,366,822 B1 | * | 4/2002 | Heavlin | 700/31 |
| 6,389,380 B1 | * | 5/2002 | Bankes | 703/17 |
| 2002/0147577 A1 | * | 10/2002 | Bankes | 703/22 |

OTHER PUBLICATIONS

Yang et al., R.J. Robustness optimization for vehicular crash simulations, IEEE Computing in Science & Engineering, vol. 2, No. 6, Nov.-Dec. 2000, pp. 8-13.*

Gaury et al., E.G.A. Risk analysis of rubust system design, Proceedings of the 30th Conference on Winter Simulation, Dec. 1998, pp. 1533-1540.*

Carreras et al., C. Interval methods for fault-tree analysis in robotics, IEEE Transactions on Reliability, vol. 50, No. 1, Mar. 2001, pp. 3-11.*

Barton, R.R. Design of experiments for fitting subsystem metamodels, Proceedings of the 29th Conference on Winter Simulation, Dec. 1997, pp. 303-310.*

Donohue, J.M. Experimental designs for simulation, Proceedinbgs of the 26th Conference on Winter Simulation, Dec. 1994, pp. 200-206.*

Allen et al., T. Low cost response surface methods for and from simulation optimization, Proceedings of the 2000 Winter Simulation Conference, pp. 704-714.*

Kleijnen, J.P.C. Five-stage procedure for the evaluation of simulation models through statistical techniques, Proceeedings of the 28th Conference on Winter Simulation, Nov. 1996; pp. 248-254.*

Barton, R.R. Simulation metamodels, Proceedings og the 30th Conference on Winter Simulation, Dec. 1998, pp. 167-174.*

* cited by examiner

*Primary Examiner*—Russell Frejd
(74) *Attorney, Agent, or Firm*—David B. Kelley

(57) ABSTRACT

The method and system of the present invention allow a designer of a mechanical system to quickly and easily determine the optimal design for the system. The steps include creating models of the mechanical system and simulating the performance of the models to achieve a set of results. From these results, Response Surface Models can be determined. These Response Surface Models act as surrogates for the more complex models of the mechanical system, and can be used to optimize the performance of the system. If necessary or desired, these Response Surface Models can be optimized over a range of possible values for the design parameters to achieve a robust design.

10 Claims, 3 Drawing Sheets

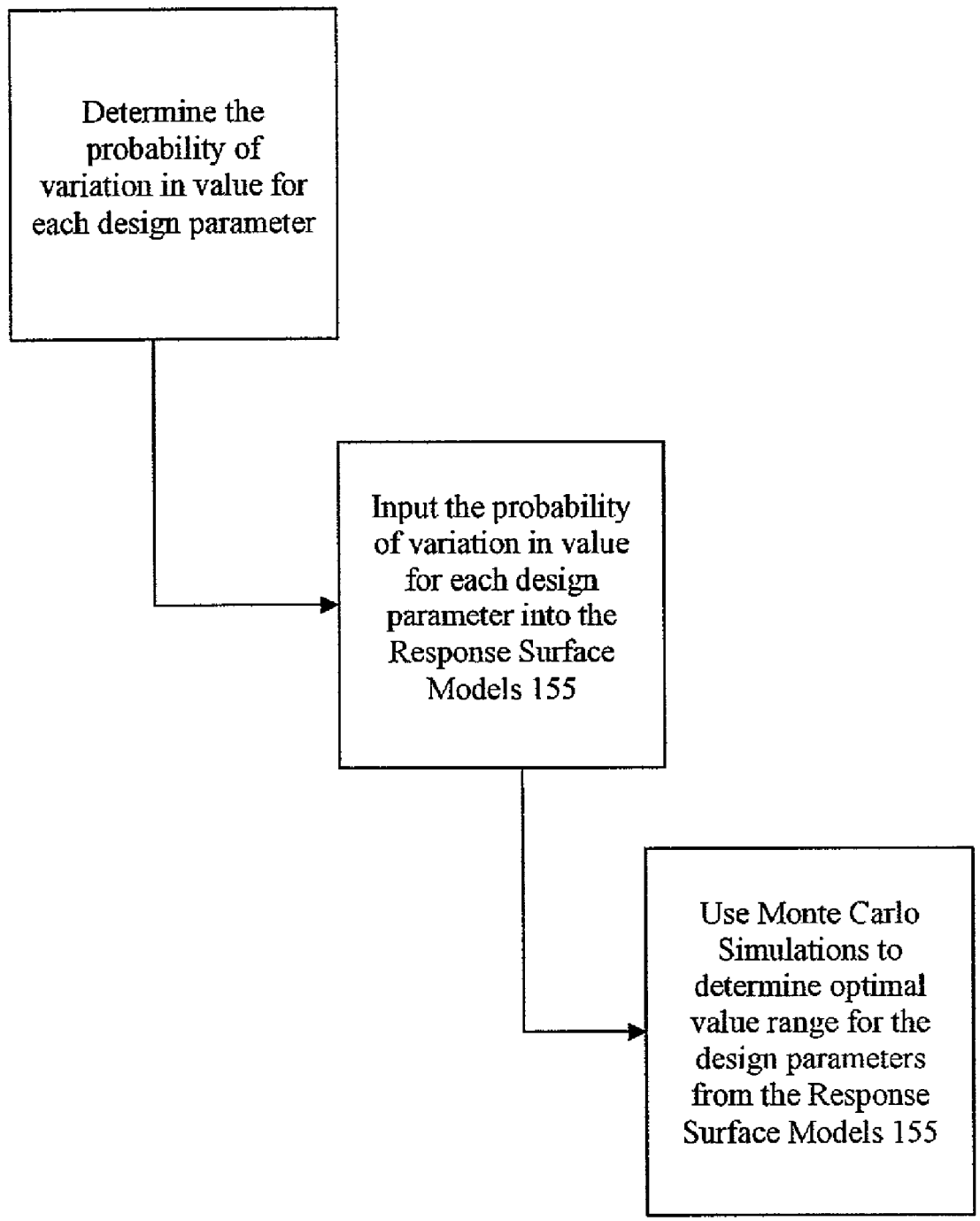

US 6,980,939 B2

METHOD AND SYSTEM FOR OPTIMIZING THE DESIGN OF A MECHANICAL SYSTEM

CROSS REFERENCE TO RELATED APPLICATIONS

This application claims priority to Provisional Application No. 60/299,280 which was filed on Jun. 18, 2001 and is incorporated herein by reference.

BACKGROUND OF INVENTION

1. Technical Field of the Invention

The system described herein relates in general to the optimal design of mechanical systems and in particular to the use of models and simulations during the design of a mechanical system in order to achieve optimal performance for mechanical system in robust operating conditions.

2. Background of the Invention

The creation of models of mechanical systems is well-known in the art. In the past, manufacturers designed and manufactured prototypes of mechanical systems whose performance could then be tested by operating them in a variety of operating conditions, mimicking actual operating conditions. For example, automobile manufacturers would create a number of prototypes of a new vehicle design, each of which could be operated on a proving ground to test its performance. These prototypes would be tested, modified, tested again, modified again, etc. until the designer was satisfied with the test results. This process was very time consuming and expensive and did not ensure that the manufacturer was obtaining the optimum design for that system, only that it was the best design of those tested.

Since the proliferation of computers, manufacturers utilized software programs to model the performance of mechanical systems. Manufacturers would create many models of a mechanical system by simply varying its design parameters. The performance of each of these models could then tested by a computer running a simulation software program. This simulation program would compile results of specified performance attributes for each model so that the designer could determine which of the models yielded the best performance. While better than the prototype process described above, this new process suffered from many of the same problems. It, too, was time consuming and required many simulations to find a satisfactory design. Furthermore, this process also did not ensure that the designer obtained the optimum design for the system, only that the design was the best design of those tested.

SUMMARY OF INVENTION

In one aspect, the invention is directed to a method for optimizing the design of a mechanical system. The method includes the step of determining a plurality of design parameters. The method further includes determining a range of variation for each of the design parameters. The method also comprises determining a space-filling Latin Hypercube design of experiment matrix based upon the ranges of variation for each of the design parameters. Still further, the method comprises creating a plurality of models of the mechanical system based upon the space-filling Latin Hypercube design of experiment matrix and also creating a simulation test. The simulation test is used to simulate the performance of each of the models of the mechanical system, which outputs a simulation result for each of the models. The method also comprises determining if any of the simulation results is a faulty or inaccurate simulation result, discarding any such faulty or inaccurate simulation result, and consolidating the remaining accurate simulation results into a simulation results summary. The plurality of accurate simulation results comprises a performance attribute result for each of a plurality of performance attributes. The method further comprises creating a plurality of response surface models, each of which being related to all of the performance attribute results in the simulation results summary for one of the performance attributes. The response surface models being capable of modeling the performance of its corresponding performance attribute over the range of variation for each of the design parameters. Still further, the method comprises choosing a desired performance metric for each of the plurality of response surface models and selecting a design parameter value from the range of variation for each of the design parameters, whereby the selecting optimizes the desired performance metrics for at least one of the plurality of response surface models.

In another aspect, the invention is directed to a system for implementing the process described above with the use of a computer running a software program.

BRIEF DESCRIPTION OF DRAWINGS

These and other features and advantages of the present invention will be apparent to those of ordinary skill in the art in view of the detailed description of the preferred embodiment which is made with reference to the drawings, a brief description of which is provided below.

FIG. 3 is a flowchart showing details of the Robustness Optimization step.

DETAILED DESCRIPTION

This invention is an improvement over prior modeling and simulation processes and is designed to yield the optimum design of a mechanical system. As more fully described below, the method creates a number of models of a mechanical system based on a Latin Hypercube Sampling design of experiment matrix. This matrix determines values for each of the design parameters, and ensures the most accurate modeling based on a given number of models. These models are then simulated, and the results of the simulations are recorded for each of a number of performance attributes. Faulty or inaccurate results are discarded and the remaining results are organized by performance attribute to create a Response Surface Model for each performance attribute. A Response Surface Model is able to estimate a specific performance attribute for a range of variation of design parameters based on the known response of the simulated models. The designer chooses the desired performance of the performance attributes, and the Response Surface Models are then utilized to yield the design parameter values that result in a performance of the system that most closely fits with the desired performance. The method disclosed herein is less time consuming than prior modeling and simulation processes. Furthermore, this method obtains the optimum design of the mechanical system.

Figure 1:
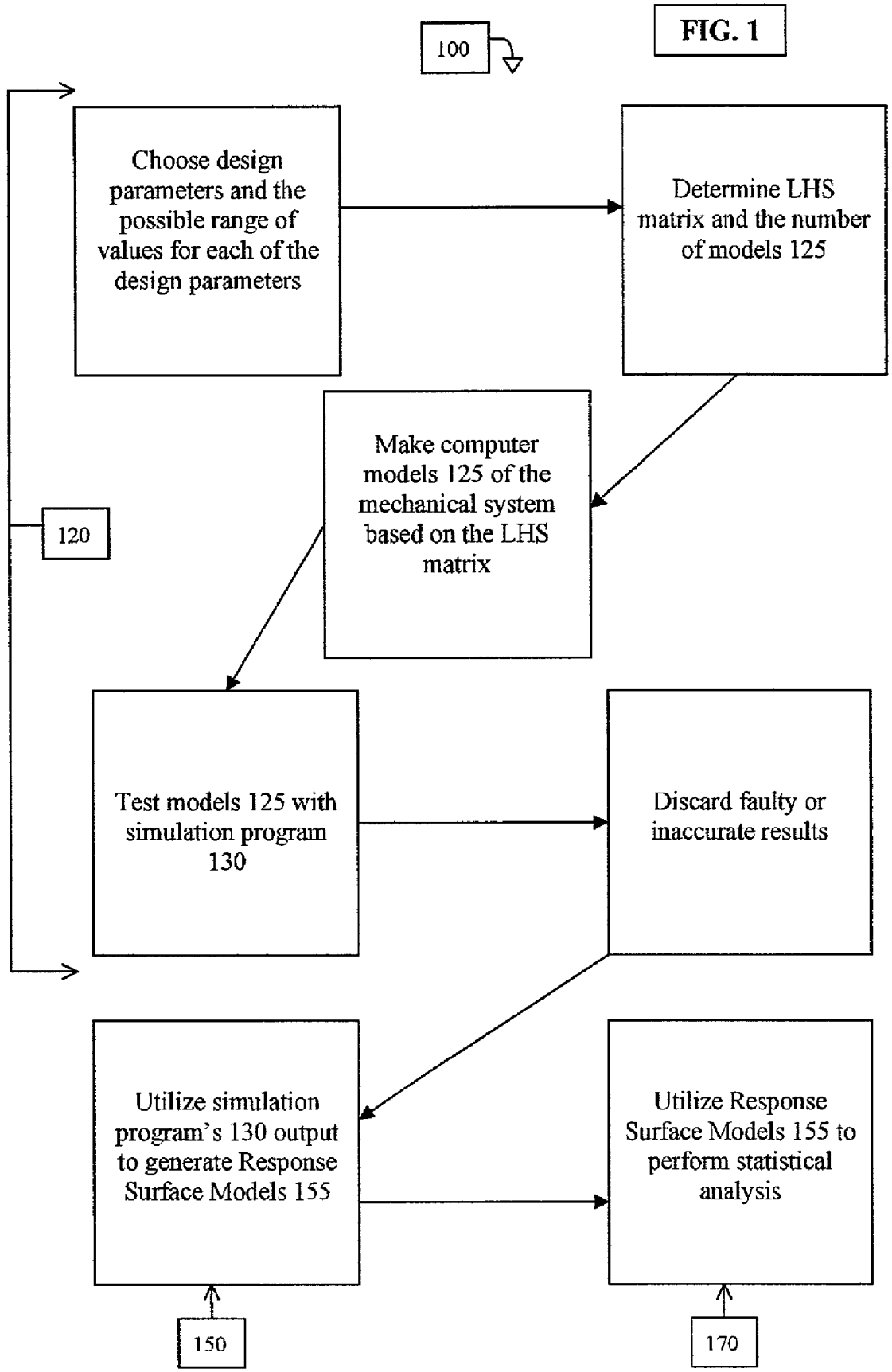
FIG. 1 is a flowchart showing details of the Modeling and Simulation step of the process.

A preferred embodiment of the present invention is comprised of two basic steps, Modeling and Simulation 100 and Determination of Optimal Design Parameters 200. The Modeling and Simulation step 100 can be broken down into component steps, Design of Experiment ("DOE") 120, Response Surface Modeling 150, and Statistical Analysis 170, as shown in FIG. 1. Although the invention is described as a sequence of steps, the steps may be reorganized without departing from the scope of the invention.

In the DOE 120 step, models 125 of the mechanical system are created. It is well known in the art to model a mechanical system, for example, with a computer software program like the ADAMS program by Mechanical Dynamics Inc. of Ann Arbor, Mich. or with a similar software program. First, a designer chooses which design parameters can be modified, and the range of possible values for each parameter. The models 125 are based on different variations of the design parameters of the mechanical system. The values for the design parameters are selected by Latin Hypercube Sampling ("LHS"). LHS is a stratified sampling technique where the random variable distributions are divided into equal probability intervals. A probability is randomly selected from within each interval for the basic variables. Essentially, a number of models 125 are created based upon combinations of values, chosen by LHS, for each design parameter. Preferably, the number of models 125 is equal to ten times the number of design parameters. These models 125 are then tested, preferably by a computer simulation program 130. Computer simulating programs 130, like the ADAMS program by Mechanical Dynamics Inc. of Ann Arbor, Mich., simulate the performance of mechanical models and are well known in the art. Simulation programs 130 provide results that describe the performance attributes of the mechanical system, for example, the vertical travel of a shock absorber. At this point, faulty or inaccurate results are discarded. Faulty results are those determined by the designer to be unreliable. A result may be deemed faulty if the time required to obtain the result by the simulation program 130 is significantly shorter than the average simulation time required to obtain a result. Another example of a faulty result is if the mechanical system does not return to static equilibrium. The remaining "accurate" results are then used in the Response Surface Modeling step 150.

In the Response Surface Modeling step 150, the simulation program's 130 output is utilized to model the performance of the performance attribute over the range of possible values for the design parameters. This results in Response Surface Models 155. One type of Response Surface Model 155 is an equation that describes the performance of the performance attribute as a polynomial with the design parameters as the variables, i.e., $F(x_1, x_2, \ldots x_n) = d(x_1) + d(x_2) + \ldots + d(x_n)$ where $F(x_1, x_2, \ldots x_n)$ is the Response Surface Model 155 for the performance of performance attribute F and $d(x_n)$ is the contribution of design parameter $x_n$ to the performance of F. Each of the performance attributes is similarly modeled and expressed as a function of the design parameters. These Response Surface Models 155 act as surrogates for the more complex modeling and simulation programs described in the DOE step 120.

The Statistical Analysis step 170 utilizes the Response Surface Models 155 generated in the Response Surface Modeling step 150 to perform statistical analysis of the performance attributes. In this step 170, the designer can determine which of the design parameters has the largest effect on each of the performance attributes. Furthermore, the designer can determine the main effect of each design parameter upon each performance attribute.

Figure 2:
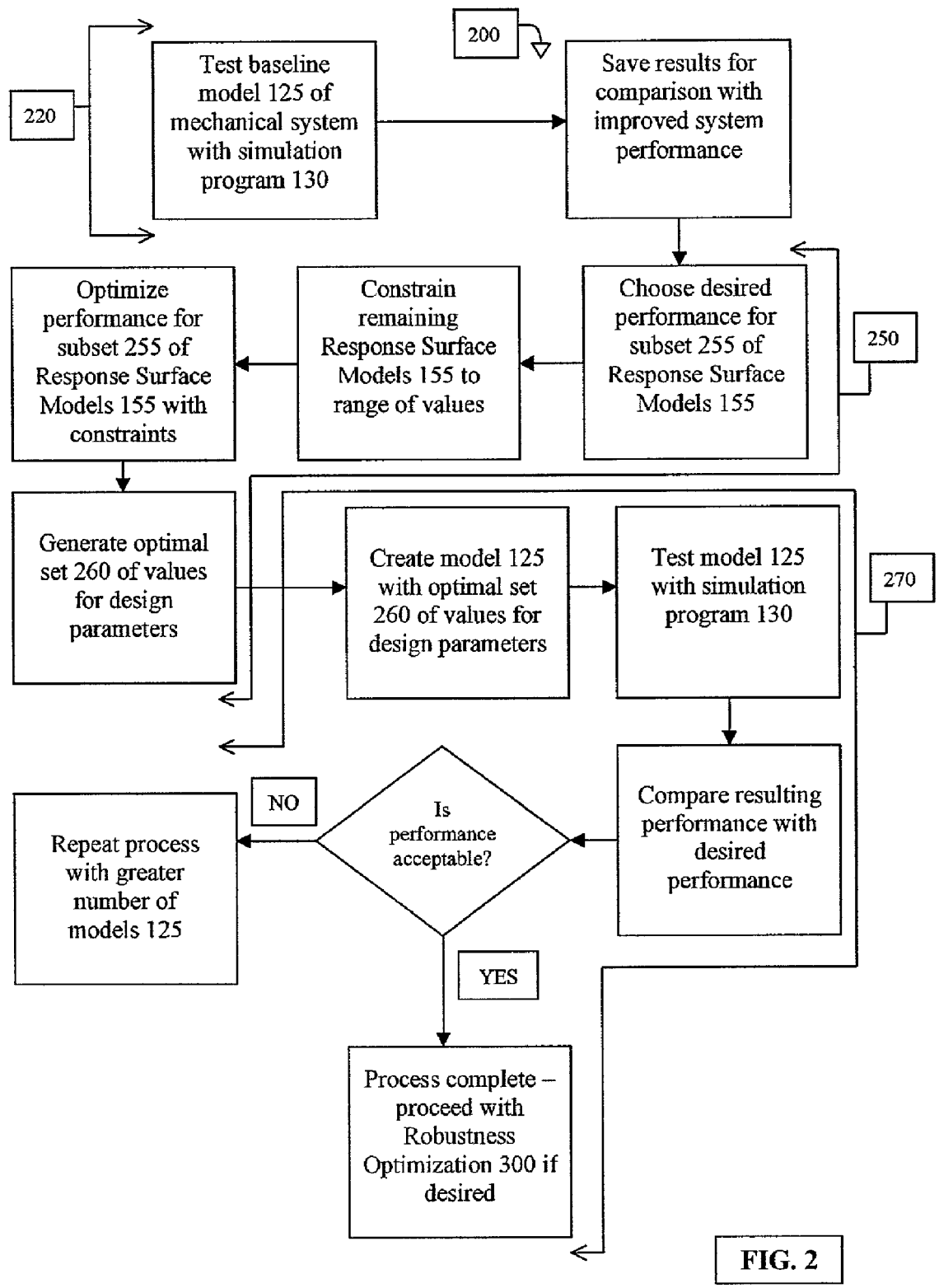
FIG. 2 is a flowchart showing details of the Determination of Optimal Design Parameters step of the process.

The Determination of Optimal Design Parameters step 200 can be further broken down into its component steps, as shown in FIG. 2. These component steps are Baseline Analysis 220, Optimization 250, and Confirmation of Optimal Design 270. In the Baseline Analysis step 220, the baseline model 125 of the mechanical system is tested by the computer simulation program 130. The results of this test are saved as a control for comparing with the results of the new design, if desired.

In the Optimization step 250, the designer chooses the performance attributes to be optimized. Preferably, the designer would choose to minimize or maximize the output of a subset 255 of the Response Surface Models 155 over the range of possible values for each of the design parameters, while keeping the remaining Response Surface Models 155 as constraints on the performance of the system. For example, in a system with performance attributes $F_1$ and $F_2$, the designer may choose to minimize the Response Surface Model $F_1(x_1, x_2, \ldots x_n)$ while maintaining the constraint that Response Surface Model $F_2(x_1, x_2, \ldots x_n)$ cannot exceed a level $Y_{upper}$ nor fall below a level $Y_{lower}$. Of course, one skilled in the art would recognize that there are other ways to optimize the performance of the mechanical system, for example, by attempting to minimize or maximize all of the Response Surface Models 155 or by attempting to tune a subset 255 of the Response Surface Models to specific levels. Furthermore, different schemes of optimization may be employed by the designer, e.g., placing more emphasis on certain performance attributes at the expense of others.

The result of the Optimization step 250 is an optimal set 260 of values for the design parameters that optimizes the performance of the mechanical system. In the Confirmation of Optimal Design step 270, this optimal set 260 of design parameter values is then used to create a model 125 of the mechanical system, which is then tested by the computer simulation program 130. The model 125 is simulated to confirm the expected "optimal" results. Because the Response Surface Models 155 are based on incomplete modeling data of highly non-linear responses, it is possible that the model 125 of the mechanical system with the optimal set 260 of design parameter values does not perform as expected. In this rare occurrence, the designer should repeat the process with an increased number of models in the DOE step 120. As stated above, the preferred number of models 125 tested in the DOE step 120 is ten times the number of design parameters of the mechanical system. This ratio has been found to be the best choice for road load analysis in the design of vehicles. There is a trade-off between the number of models 125 that are simulated in the DOE step 120 and the time required to complete the process, with the greater the number of models 125 yielding more accurate results at the expense of taking longer to complete, and vice-versa. The optimal number of models 125 for a particular mechanical system will vary depending on many factors, e.g., the non-linearity of the responses that the Response Surface Models 155 attempt to describe.

As an additional step, or as a substitute for the Optimization step 250, the designer could perform the Robustness Optimization step 300, as shown in FIG. 3. This step 300 will increase the robustness of the design of the mechanical system by making it less susceptible to changes in the value of its design parameters, and ensure that the optimal design will be robust enough for real-world applications. As with any real world mechanical system, the design parameters cannot be controlled with one hundred percent accuracy. The actual values of the design parameters in the physical system will vary because of manufacturing capabilities and may even change throughout use.

In order to achieve an optimal design for a range of actual values of the design parameters, the Robust Optimization step 300 uses Monte Carlo Simulations. Monte Carlo Simulation is a process by which a system can be modeled by assigning probabilities to the variability of the design parameters, and is well known in the art. Essentially, the designer determines the probability of variation in the value for each design parameter and inputs that information into a Monte Carlo Simulation for the Response Surface Models 155 to determine the optimal value range. For example, with the Response Surface Model $F(x_1, x_2, \ldots x_n) = d(x_1) + d(x_2) + \ldots + d(x_n)$, the values for design parameters $(x_1, x_2, \ldots x_n)$ may vary by +/−5% in a uniform probability distribution when actually manufactured. With this information, Monte Carlo Simulation allows the designer to optimize the Response Surface Model $F(x_1, x_2, \ldots x_n)$ around the range of probable values for the design parameters $(x_1, x_2, \ldots x_n)$, rather than around absolute values. This added robustness is not necessary for all mechanical systems, but is especially useful for designing mechanical systems in which the values of the design parameters will vary over time or with extended use.

The process described above is best implemented with the use of computers and computer software programs. Computer programs can automate many of the steps such that they are transparent to the designer of the mechanical system. It is possible to store in a computer program such information as the number and type of design parameters in order to simplify the decisions to be made by the designer.

In summary, persons of ordinary skill in the art will readily appreciate that a method and system for optimizing the design of mechanical systems has been provided. Designers implementing the teachings of this method and system can enjoy designing optimal systems in less time and with less work than previous methods of design.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A computer-implemented method for optimizing the design of a mechanical system comprising:
   (a) determining a plurality of design parameters,
   (b) determining a range of possible values for each of said design parameters,
   (c) determining a space-filling Latin Hypercube Sampling design of experiment matrix based upon said ranges of possible values for each of said design parameters,
   (d) creating a plurality of models of said mechanical system based upon said space-filling Latin Hypercube Sampling design of experiment matrix,
   (e) creating a simulation test,
   (f) simulating the performance of each of said plurality of models of said mechanical system with said simulation test, said simulating outputting a simulation result for each of said models,
   (g) determining if any of said simulation results is a faulty simulation result,
   (h) consolidating said simulation results into a simulation results summary, said consolidating comprising the step of discarding any said faulty simulation result, whereby said simulation results summary comprises a plurality of accurate simulation results, each of said plurality of accurate simulation results comprising a performance attribute result for each of a plurality of performance attributes,
   (i) creating a plurality of response surface models, each of said plurality of response surface models being related to all of said performance attribute results in said simulation results summary for one of said plurality of performance attributes,
   each of said plurality of response surface models being capable of modeling the performance of said one of said plurality of performance attributes over said range of possible values for each of said design parameters,
   (j) choosing a desired performance metric for each of said plurality of response surface models, and
   (k) optimizing the performance of at least one of said plurality of response surface models to achieve said desired performance metrics, whereby said optimizing outputs an optimal design parameter value from said range of possible values for each of said design parameters.

2. The method of claim 1, further comprising the steps of determining a probability distribution for a range of variation for each of said design parameters and further optimizing the performance of at least one of said plurality of response surface models to achieve said desired performance metrics, whereby said further optimizing outputs an optimal design parameter value range from said range of possible values.

3. The method of claim 1, wherein said optimizing the performance of at least one of said plurality of response surface models to achieve said desired performance metrics is accomplished by minimizing said at least one of said plurality of response surface models.

4. The method of claim 1, wherein said optimizing the performance of at least one of said plurality of response surface models to achieve said desired performance metrics is accomplished by maximizing said at least one of said plurality of response surface models.

5. The method of claim 1, further comprising:
   creating an optimal model of said mechanical system, said optimal model based on said optimal design parameter value for each of said design parameters,
   simulating the performance of said optimal model with said simulation test,
   said simulating outputting an optimal simulation result, and
   comparing said optimal simulation result to said desired performance metrics.

6. A system for optimizing the design of a mechanical system comprising:
   (a) a computer,
   (b) an input unit operatively coupled with said computer, said input unit being capable of receiving a plurality of design parameters and a range of possible values for each of said design parameters,
   said input unit being further capable of transmitting said plurality of design parameters and said range of possible values for each of said design parameters to said computer,
   (c) a first computer software program portion, said first computer software program being capable of determining a space-filling Latin Hypercube Sampling design of experiment matrix based upon said ranges of possible values for each of said design parameters,
   (d) a second computer software program portion, said second computer software program being capable of creating a plurality of models of said mechanical system based upon said space-filling Latin Hypercube Sampling design of experiment matrix, (e) a third computer software program portion, said third computer software program being capable of simulating the performance of each of said plurality of models of said mechanical system, said simulating outputting a simulation result for each of said models, (f) a fourth computer software program portion, said fourth computer software program portion being capable of determining if any of said simulation results is a faulty simulation result, (g) a fifth computer software program portion, said fifth computer software program portion being capable of consolidating said simulation results into a simulation results summary, said consolidating comprises the step of discarding any said faulty simulation result, whereby said simulation results summary comprises a plurality of accurate simulation results, each of said plurality of accurate simulation results comprising a performance attribute result for each of a plurality of performance attributes, (h) a sixth computer software program portion, said sixth computer software program portion being capable of creating a plurality of response surface models, each of said plurality of response surface models being related to all of said performance attribute results in said simulation results summary for one of said plurality of performance attributes, each of said plurality of response surface models being capable of modeling the performance of said one of said plurality of performance attributes over said range of possible values for each of said design parameters, (i) a seventh computer software program portion, said seventh computer software program portion being capable of optimizing the performance of at least one of said plurality of response surface models to achieve a set of desired performance metrics, whereby said optimizing outputs a design parameter value from said range of possible values for each of said design parameters.

7. The system of claim 6, wherein said input unit is further capable of receiving a probability distribution for a range of variation for each of said design parameters, said input unit being further capable of transmitting said probability distribution for said range of variation for each of said design parameters to said computer, and further comprising an eighth computer software program portion, said eighth computer software program portion being capable of optimizing the performance of at least one of said plurality of response surface models to achieve a set of desired performance metrics, whereby said optimizing outputs a design parameter value range from said range of possible values for each of said design parameters.

8. The system of claim 6, wherein said optimizing the performance of at least one of said plurality of response surface models to achieve a set of desired performance metrics is accomplished by minimizing said at least one of said plurality of response surface models.

9. The system of claim 6, wherein said optimizing the performance of at least one of said plurality of response surface models to achieve a set of desired performance metrics is accomplished by maximizing said at least one of said plurality of response surface models.

10. The system of claim 6, further comprising an eighth computer program portion, said eighth computer program portion being capable of creating an optimal model of said mechanical system, said optimal model based on said optimal design parameter value for each of said design parameters, simulating the performance of said optimal model with said simulation test, said simulating outputting an optimal simulation result, and comparing said optimal simulation result to said set of desired performance metrics.

* * * * *